(12) United States Patent
Gering (10) Patent No.: US 8,073,189 B2
(45) Date of Patent: Dec. 6, 2011

(54) METHODS AND SYSTEMS FOR SELECTING AN IMAGE APPLICATION BASED ON IMAGE CONTENT

(75) Inventor: David Thomas Gering, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 968 days.

(21) Appl. No.: 11/833,682

(22) Filed: Aug. 3, 2007

(65) Prior Publication Data

US 2009/0034782 A1 Feb. 5, 2009

(51) Int. Cl.
*G06K 9/00* (2006.01)
(52) U.S. Cl. ........................................ 382/100; 382/305
(58) Field of Classification Search .................. 382/100, 382/305
See application file for complete search history.

(56) References Cited

U.S. PATENT DOCUMENTS

| | | | |
|---|---|---|---|
| 6,181,817 B1 | 1/2001 | Zabith et al. | |
| 6,549,660 B1 | 4/2003 | Lipson et al. | |
| 6,950,554 B2 * | 9/2005 | Shiratani | 382/224 |
| 7,672,533 B2 * | 3/2010 | Yamada | 382/274 |
| 2002/0075332 A1 * | 6/2002 | Geilfuss et al. | 345/859 |
| 2002/0180783 A1 * | 12/2002 | Broussard | 345/744 |
| 2004/0061889 A1 | 4/2004 | Wood et al. | |
| 2004/0169680 A1 * | 9/2004 | Stevens et al. | 345/763 |

OTHER PUBLICATIONS

A.C. Evans, D.L. Collins, S.R. Mills, E.D. Brown, R.L. Kelly, T.M. Peters. "3D Statistical Neuroatomical Models from 305 MRI Volumes". In: Proc. IEEE Nuclear Science Symp. Medical Imaging Conf.. IEEE, 1993; 1813-1817.
A.W.M. Smeulders, M. Worring, S. Santini, A. Gupta, R. Jain. "Content-based image retrieval at the end of the early years". IEEE Transactions on Pattern Analysis and Machine Intelligence Dec. 2000; 22:1349-1380.
P. Viola, W.M. Wells. "Alignment by maximization of mutual information". International Journal of Computer Vision Sep. 1997; 24:137-154.
A. Witkin. "Scale Space Filtering". In: Proc. International Joint Conference on Artificial Intelligence. Karlsruhe: 1983.
T.P. Thirion. "Image matching as a diffusion process: an analogy with Maxwell's demons". Medical Image Analysis 1998; 2.
W.M. Wells, P. Viola, H. Atsumi, S. Nakajima, R. Kikinis. "Multimodal volume registration by maximization of mutual information". Medical Image Analysis 1996.
R.O. Duda, P.E. Hart, D.G. Stork. Pattern Classification. John Wiley & Sons, 2001.

* cited by examiner

*Primary Examiner* — Stephen Koziol
(74) *Attorney, Agent, or Firm* — McAndrews, Held & Malloy, Ltd.; Armando Pastrana, Jr.

(57) ABSTRACT

Certain embodiments of the present invention provide methods and systems for selecting an application for processing an electronic image file based upon the content of the image file. Certain embodiments provide an image selector selecting an image from an image storage device, an identification module providing a label to the image based on the content of the image, an application selector choosing at least one application from a plurality of applications to process the image, and a learning unit maintaining a record of image labels and the applications presently and previously processing the images.

20 Claims, 6 Drawing Sheets

METHODS AND SYSTEMS FOR SELECTING AN IMAGE APPLICATION BASED ON IMAGE CONTENT

BACKGROUND OF THE INVENTION

The present invention generally relates software application selection. More particularly, the present invention relates to methods and systems for selecting an application to process an electronic image based on image content.

Certain electronic images may require use of a particular software application for processing. Workstations for medical image processing, for example, typically provide a collection of various software products and applications. Certain software applications may be used primarily and/or exclusively for one particular types of images, such as brain scans. Additionally, certain images may require a particular processing application in order to process the image. For example, an attempt to open an image of an orthopedic knee scan using brain scanning software may result in improper image processing, or even no processing at all, because of the particular functionality of the brain scanning software.

Further, certain applications are designed to process dissimilar data simultaneously to generate images. For example, a neuro-analysis application may receive both T1-weighed and T2-weighted MRI data sets as input to segment a brain scan. Segmentation may involve assigning a label to each image pixel according to the tissue type represented, and using a plurality of MRI scanning protocols, each with a different mechanism, to generate contrast between various tissues.

Certain workstations provide a means for browsing a database of images, and loading an image or a set of images into local memory. Typically, however, a limited number of browsers exists to support all applications. Thus, it may be common practice for a user desiring to process an image to first select an image, or a data file from a database of images and then select an application to process the image as a separate step. Alternatively, the user may first select an image processing application, and then select images individually through the application for processing. This process can be cumbersome and time consuming, particularly where the user is to view several images at once.

Certain workstations or software systems automatically recognize the application necessary to process a file based on the file name. For example, a file labeled with an extension ".doc" in Microsoft Windows will automatically be processed by Microsoft Word when that file is selected. These systems, however, do not use the content of the file to determine the application. Accordingly, a mislabeled file may lead to incorrect application selection.

Data and/or electronic images may be classified, or organized into image classes, based on labels or tags or metadata provided with the data, the filenames of the data, the pixilation layout or content of the data, or a combination of these elements. For example, U.S. Pat. No. 6,549,660 issued to Lipson, et al. ("the '660 patent"), describes a method and apparatus for classifying images by identifying relationships between the images and a category model or template. Though Lipson describes a method to categorize and classify images based on image content, it does not provide resources for selecting an application to open and process the image based upon the content of the image.

It is thus desirable to provide a technique which may be used to automatically select, open and execute an image processing application based upon the content of the image selected for processing.

BRIEF SUMMARY OF THE INVENTION

Certain embodiments of the present invention provide methods and systems for selecting an image processing application based upon the content of the image.

Certain embodiments provide an image processing application selection system comprising an image selector selecting an image from an image storage device, an identification module providing a label to the image based on the image content, an application selector operating an application to process the image, and a learning unit maintaining a record of image labels and the applications presently and previously processing images. In certain embodiments, the learning unit updates record with the label provided to the image and the application that processes the image. In certain embodiments the application selector chooses the application based on label provided by the identification module and the record kept by learning unit.

Certain embodiments provide a method of selecting an application for image processing comprising selecting an electronic image, classifying the image based upon the image content, matching the image with an application to process the image based on the image classification, processing the image with the matched application, and maintaining a record of images presently and previously processed and the applications processing the images, updating the record when an image is processed.

Certain embodiments provide an image processing application selection system comprising an image retrieval device selecting an electronic image from an image storage device, a region partitioner, partitioning the image into one or more image regions, a relationship processor identifying relative relationships between the regions, an association operator associating attributes of each region with at least one other region in the image, a template database with multiple template images representing at least one image class, a detector matching the image with at least one said template and classifying the image with the image class associated with the template, an application selector providing an application to process the image based on the class of the image, and a learning unit maintaining a record of applications presently and previously operating the images.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Certain embodiments provide systems and methods for automatically selecting an application to process an image file based upon the content of the image. The content used to make this selection may include pixel data of the image, header data, such as tags, titles and other metadata, or a combination of both. In certain embodiments, the system may adaptively learn appropriate applications for processing certain images based on content of the images by recognizing patterns, trends and tendencies of prior successful image processes.

In certain embodiments, where more than one application may be capable of processing a certain image, the relevant applications may be presented to the user or to an automated interface for selection. In certain embodiments, where only a subset of the features of an application might apply to an image, for example, the relevant features may be highlighted for the user, to aid in making a selection, or enabling a multi-purpose application to present a simplified interface to the user, depending on the type of image to process. In certain embodiments, where the system is unable to recognize the content of an image, the system may provide the user a list of applications or features for manually selection.

In certain embodiments, the system may adaptively learn to understand which image content is appropriate for which application. For example, when a selected image or dataset is successfully analyzed by an application that was selected either automatically or by a user, the image and application pair may be used to train the system, by recognizing the relationship for future use. In certain embodiments, the system may adapt to the particular habits of a particular institution, user or workstation In certain embodiments, a system may learn appropriate applications for images by using Bayesian inference. A Bayesian inference is a statistical inference in which evidence or observations are used to update or to newly infer the probability that a hypothesis may be true. In certain embodiments, the Bayesian inference may provide a statistical method for selecting the best hypothesis from a set of competing hypotheses, H. For example, a system may have one hypothesis that an image is a cardiac scan, another hypothesis is that the image is a brain scan, and other hypotheses such that there is one hypothesis for each image class. To weigh the evidence supporting alternative hypotheses, the evidence may then be formulated as either a likelihood or a prior probability, where:

$P(h)$=the probability of hypothesis, $h$, being true prior to observing data, $D$; and  (Eq. 1)

$P(D|h)$=the likelihood of the data, $D$, occurring, given that hypothesis $h$ is true.  (Eq. 2)

Using Eq. 1 and Eq. 2, the Bayesian inference selects the hypothesis which exhibits the maximum a posteriori probability (MAP), or, the hypothesis with the highest probability of being true, given the data, D. The MAP hypothesis, represented below as $h_{MAP}$ may be computed by applying Baye's rule to the likelihood and the prior probabilities:

$$h_{MAP} = \mathop{\mathrm{argmax}}_{h \in H} P(h \mid D) = \mathop{\mathrm{argmax}}_{h \in H} P(D \mid h) P(h)$$  (Eq. 3)

The "arg max" operator selects the hypothesis whose MAP is the largest. The MAP for each hypothesis is computed by multiplying two terms, the likelihood and the prior probability, each of which can be readily measured from training data. If the prior probabilities, P(h), of all hypotheses are equal, then the resulting MAP is equivalent to the maximum likelihood hypothesis (ML). That is, the best hypothesis is the one corresponding with the highest likelihood of the data D occurring. The system can learn within a Bayesian framework by adjusting either the likelihood or the prior probabilities with the result of each new image process.

In certain embodiments a Bayesian inference may be made by inferring a probability based upon a record of previously successful application selections—that is, a record of images, classified by content, and the applications by which they were successfully processed. Based upon the record of prior successful application selections and the content of the selected image, an inference is made that a hypothesis (e.g. that a certain application is appropriate) is true.

A demonstration of Bayesian learning for certain embodiments is represented as follows. Assume a user selects an application based on the content of the words in the image header. The text in the description may be indexed by computing a record maintaining the number of occurrences of each word among all images of a database. Each time an image is successfully processed by a certain application, the words and expressions in the image header are added to the record, as exemplified by Table 1. Table 1 represents an example record of a series of words or expressions occurring in headers of images that have been processed by application, h. In the left column of the table, the word or expression, D (e.g. "Sagittal"), is listed. In the right column, the probability of those words occurring in any image already processed by the application, P(D|h), is listed.

TABLE 1

| Word: D | $P(D\backslash h)$ = # of images containing the word/ total # of images |
|---|---|
| Sagittal | .38 |
| 3D | .65 |
| SPGR | .50 |
| SE | .12 |
| EPI | .12 |

In the example depicted in Table 1, there is a 38% probability that the word "Sagittal" will occur in the header of an image that has been successfully processed by application h. By comparison, Table 1 declares a 65% probability that the expression "3D" will occur in an image that has been processed by application h. Accordingly, the system, after observing data, D, may calculate the $h_{MAP}$ using Eq. 3, and select the most likely application. If the application successfully processes the image, the database, or Table 1 in this case, is updated with the results of the recent process, and the next time an image is selected, the image header may be read, and the likelihoods derived from the updated version of the table, for example. Though a particular embodiment is described by the above example and the data of Table 1, it is not intended that the system be limited to these systems, methods or analyses.

Though the above example depicts embodiments where a system uses a label, or the image header, to classify and determine an appropriate application for image processing, other embodiments may use alternative methods to classify images and select applications. In certain embodiments, a system may use the content of the image pixel data instead of or in addition to the image header data.

Multiple types of known pixel based image analysis may be used by the system. For example, the nearest neighbor pattern matching process, and the process described in the '660 patent each teach a system and/or method for classifying an image based on the pixel data of the image.

Figure 1:
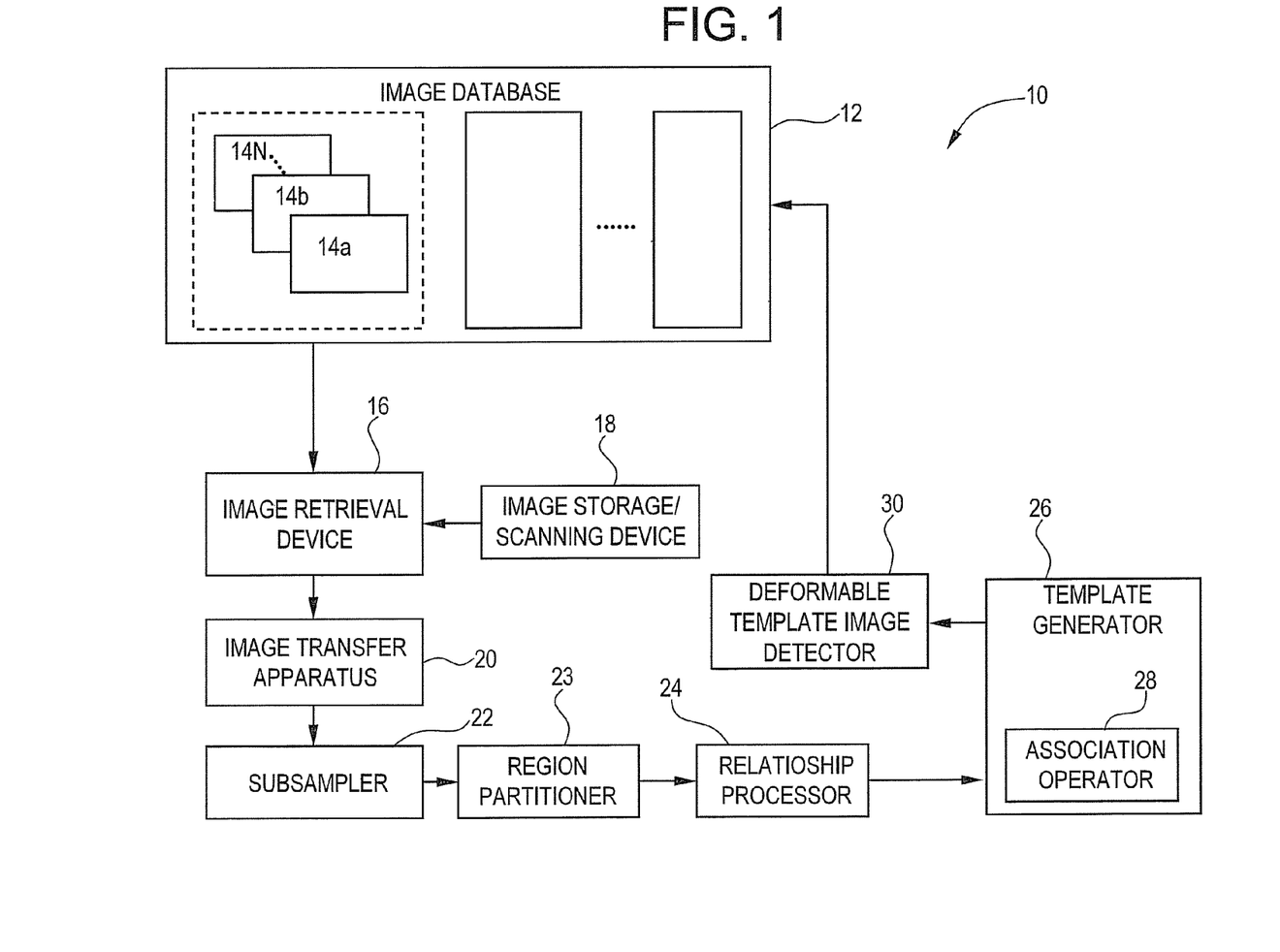
FIG. 1 illustrates model of a system for classifying an image.

FIG. 1 depicts an image classification system 10. The system 10 includes an image database 12 having stored therein a plurality of images 14a-14N generally denoted 14. The images 14 may be provided as still electronic images such as photographs or medical scans or selected frames of a video signal. In certain embodiments, the images 14 may be provided as three dimensional images. An image retrieval device 16 coupled to the image database 12 retrieves images from the database 12. The image retrieval device 16 may be a user interface providing an input for user image selection. For example, an interface may present a user with the image database 12, represented by individual icons, each icon representing an image file from the database 12. A user may browse the image database 12, and select the image using a mouse, keyboard or other input device. Alternatively, image retrieval device 16 may receive images from an image storage or image scanning device 18. Images retrieved by retrieval device 16 are fed to an image transform apparatus 20 which filters the image and provides a series of sub-images having high frequency or low frequency image components.

In certain embodiments, the system operates on images provided from low frequency image components to reduce the amount of data which must be stored and operated upon by system 10. Additionally, high frequency content of the full resolution image may be irrelevant for classification and may therefore result in the presentation of image details to the system which may result in the system providing less than optimum classification and detection results. This is due, at least in part, to the fact that the relationships between sub-images of a full resolution image may not be similar between a number of images which are part of the same scene class. For example, two images of heart scans taken from slightly different positions are likely to be quite similar in their low spatial frequency content but very different in their high resolution details because of the variations in the specific positions tissue, vessels or other components of the two images.

In certain embodiments, low frequency images may be provided using a plurality of techniques including but not limited to spatial blurring techniques and wavelet decomposition techniques. Thus, considering the original image as a full resolution image, the full resolution image may be transformed into a plurality of images having different levels of image frequency content. These images may further be transformed to a plurality of images with different levels of spatial resolution.

Images having different levels of spatial resolution may be provided by feeding image components (e.g. low frequency image components) to a subsampler 22 which samples the image components using any technique well known to those of ordinary skill in the art.

FIGS. 6A-6G depict an original image 31 that has here been transformed via image transform apparatus 20 into a plurality of images 32 (FIG. 6B), 33 (FIG. 6C), 34 (FIG. 6D) each of the images 32-34 corresponding to original image 31 at different levels of low frequency content.

Images 32-34 are generated from image 31 using a spatial blurring technique. For example, image 32 is generated using a spatial blurring technique with a Gaussian with a diameter of 3 pixels and fifty percent reduction in resolution to provide image 32'. Similarly, image 33 is generated from image 31 using a spatial blurring technique with a fixed pixel support Gaussian of 5 pixels and fifty percent reduction in resolution from image 32 to provide image 33. Thus images 31, 32, 33, and 34 form a so-called image pyramid, a technique well known to those of ordinary skill in the art.

Figures 6A, 6B, 6C, 6D:
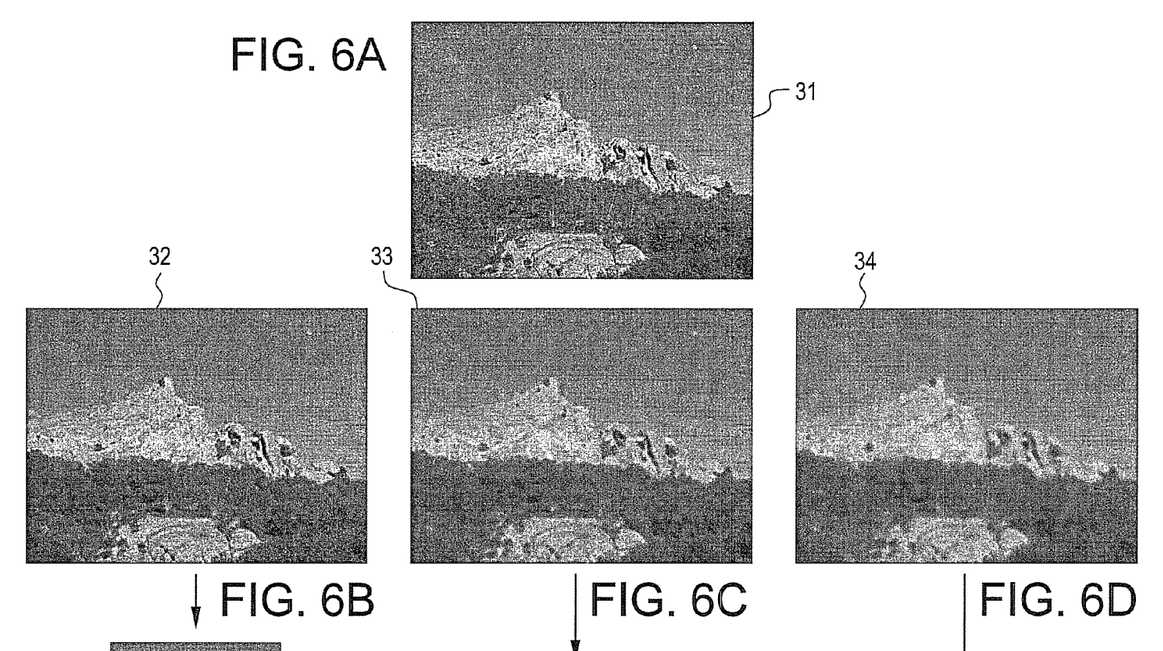
FIGS. 6A-6G illustrate an original image that has here been transformed into multiple images at different levels of frequency content.
Figure 6E:
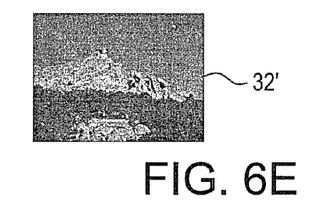
Figure 6F:
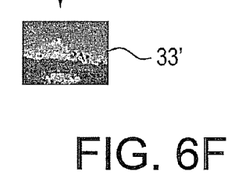
Figure 6G:
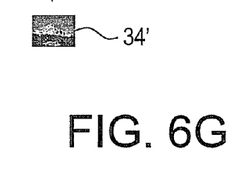

Each of the images 32-34 may then be sub-sampled via sub-sampler 22 to provide subsampled images 32' (FIG. 6E), 33' (FIG. 6F), 34' (FIG. 6G). Image 32 (FIG. 6B) includes relatively high frequency image components (e.g. a low pass filtered sequence) and thus includes some detailed image components. Image 33 (FIG. 6C) includes relatively low frequency image components (e.g. a lower pass filtered sequence) with a different frequency cut off than used to create image 32 and thus includes less detailed image components than 32. Image 34 (FIG. 6D) includes lower frequency image components than image 33 and thus includes even fewer image details than image 33.

There are several benefits to using low-frequency sub-sampled images. The first is that the dimensionality of the problem is drastically reduced. The size of the images in FIG. 6G is roughly forty times smaller than original image 31. Thus, the dimensionality of the problem has been lowered by almost two orders of magnitude. Using the low-frequency image content also confers immunity to spurious relationships due to high-frequency sensor noise. In addition it changes the focus of the problem to relationships between image regions.

Referring again to FIG. 1, predetermined sub-sampled images are fed from subsampler 22 to a region partitioner 23. Region partitioner 23 partitions image 14 into one or more image regions also known as image patches, with each of the image regions having at least one pixel. It should be noted that the image regions need not be of equal size or shape. The image regions are provided to a relationship processor 24 which identifies relative relationships between those regions which make up the image.

For example, relationship processor 24 may identify relative photometric and spatial relationships between regions in an image or relationship processor 24 may identify relative color, luminance, texture, size, shape, geometrical properties such as relative region orientations and objects within an image. The particular set of relationships which are identified depend upon a variety of factors including but not limited to a particular class of images to be operated upon. For example, when classifying or detecting natural scenes, it may be desirable to select photometric properties of images (rather than texture for example). One determinant of this choice is the nature of the attribute expected to be discriminatory between different image classes. If high frequency detail is considered a distinguishing factor, then the relationships extracted may use image texture. Thus, in this case, image transform apparatus 20 would provide high frequency image components rather than low frequency image components. The high frequency image components can be fed directly into region partitioner 23. On the other hand, if the discrimination ability is based on color components of the image, then relationships need to be extracted on the chromatic attributes of images.

An association operator 28 then associates the attributes (including the relative relationships) of each region in the image with at least one other region in the image.

A template generator 26 identifies relative relationships which are consistent between a plurality of images fed to relationship processor 24. For example, if relative spatial and photometric properties are identified by relationship processor 24 in each of a plurality of different images, then template generator 26 would identify those relative spatial and photometric relationships which were consistent between each of the plurality of images.

Template generator 26 then encodes the consistent relational information as a deformable template. The deformable template may then be used by an image detector 30 to detect class concepts in images in the image database 12. Detector 30 may also use the deformable template to register or align regions of different images.

Detection refers to the process of finding a match, between a class template and a novel image. A novel image is an image not used as an example image to generate the template. A "match" occurs when a pairing of components of the template is made to elements of the image, and all or most of the relationships between elements of the template are also satisfied by the corresponding elements of the image. Registration means using the pairing of elements of the template to elements of the image to determine a flexible transformation that aligns the template to the image. A user may wish to find corresponding regions between images that fall in the same class. By detecting the scene concept in both images, detector 30 is able to provide a mapping of regions in the first image to regions in the second image.

By identifying image properties and expressing the properties as a plurality of relative relationships, certain embodiments of the present invention performs image classification and identification based on a global organization of features and relationships in an image. Such a global organization within an image may be quantified in terms of a plurality of different image properties or characteristics including, but not limited to spatial and photometric (chromatic and luminance) image characteristics.

Figure 2:
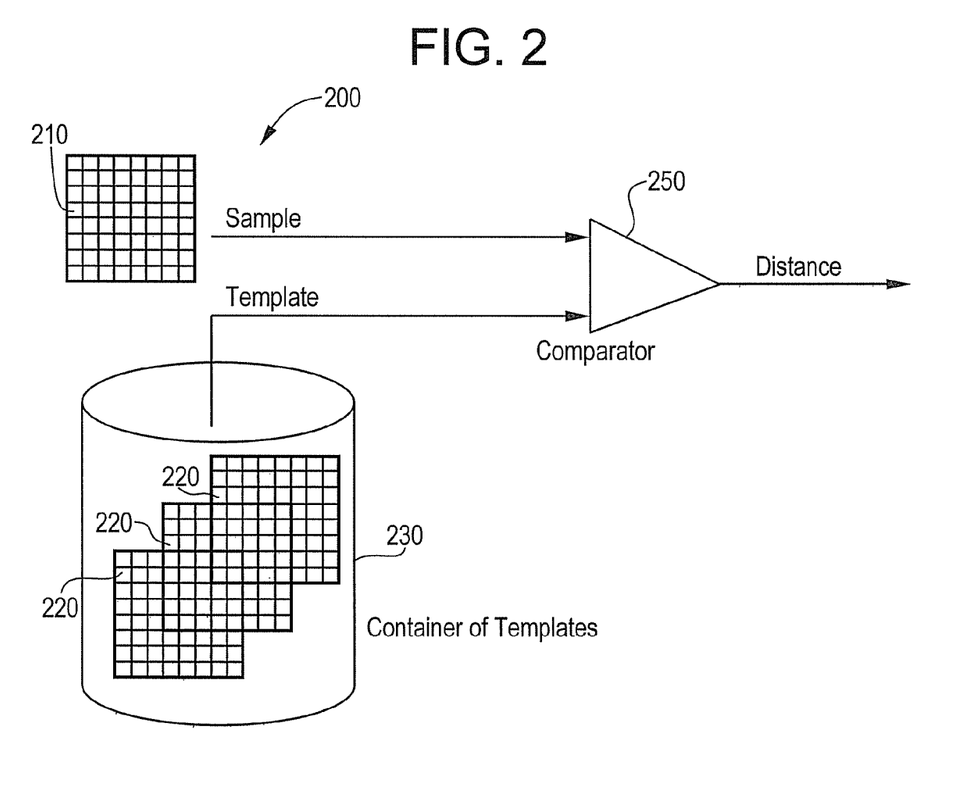
FIG. 2 illustrates model of a simplified system for classifying an image based on pixel data.

A simplified embodiment of image classification is illustrated by the diagram of FIG. 2. An image 210 is matched with an image template 220 and classified accordingly. In certain embodiments, an image 210 is selected, either automatically or by a user. The system comprises a set, or database 230 of one or more templates 220 or models, wherein each template or model represents one image class. A comparator, 230, or comparison module performs a matching analysis between the selected image 210 and each of the templates 120, for example.

In certain embodiments the comparison module 230 may perform registration, segmentation, and/or transformation on the image 210 and the template to assist in the matching process. For example, a template 220 representing a knee scan may be a two dimensional image 1088 pixels wide by 12 pixels high, and a sample image 110 may be a three dimensional scan consisting of 1280 pixels wide by 1024 pixels high and 100 slices deep. In order to accurately compare the image 210 with the template 220, the comparison module 230 may take a cross sectional slice of the image 210 so that it only has a two dimensional image of size 1280×1024 pixels. Next, the comparison module 230 may register the image 210 by compressing the image into a 1088×612 image. In another embodiment, the comparison module 230 may segment the image 210, by selecting a slice of the image that is of a 1088×612 pixel size.

In certain embodiments the comparison module may identify the both the template 220 and the image 210 as matrices, where each pixel is represented by a value based on the features of the pixel. In certain embodiments, the comparison module 230 may next calculate the difference, or distance between the image 210 and the template 220. For example, the comparison module may calculate the sum of the squares of the differences between each pixel in the image 210 with the corresponding pixel in the template 220. In certain embodiments, the comparison module 230 may determine that the template 220 which is calculated to have the smallest distance from the image 210, or in other words, to be least unlike the image 210, is matched with the image, for example. In certain embodiments, the matching may be quantified with distance metrics such as correlation or mutual information. Accordingly the class of images to which image 210 belongs may be that image class represented by the template 220 to which the image 210 is matched.

In another embodiment, a scaling treatment, such as that depicted by FIGS. 6A-6G, may be applied to significantly reduce the image resolution through steps of smoothing and down-sampling.

In certain embodiments, multiple templates 220 may represent an image class. For example, an image scan of a knee of a 90 year old 80 pound arthritic woman may be notably different from an image scan of a knee of a 22 year old 300 pound professional male athlete, even though both image scans belong to the same image class—knee scans. In such a situation, it may be beneficial to provide a variety of knee templates from for matching analysis to prevent an improper matching where an image is dissimilar with the single template representing the image class.

Figure 3:
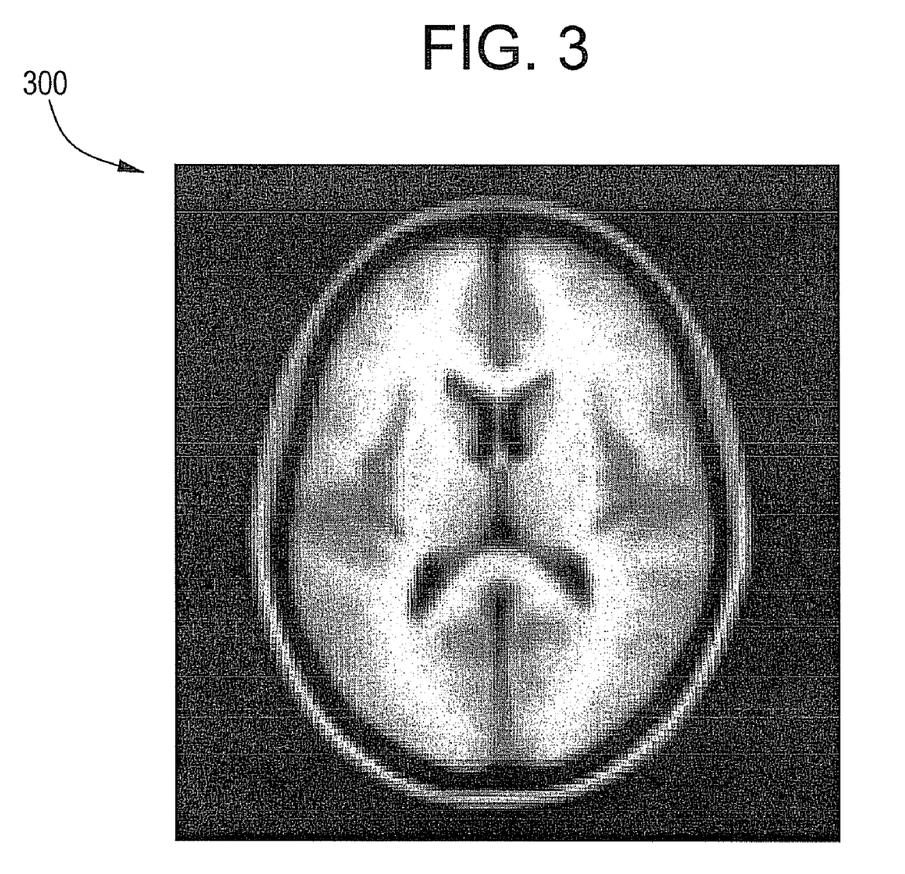
FIG. 3 illustrates a sample template image as an aggregate of multiple templates.

In certain embodiments, a plurality of individual templates may be aggregated to form a single, average template. New templates may be added, and successfully matched images may also be added to the aggregated template, continually improving the matching ability of the system. FIG. 3 depicts an example of an aggregated template for brain scans. The image 300 of FIG. 3 was produced by averaging 305 brain scans, translating pixel data into a numerical matrix and calculating an average. In certain embodiments, the aggregated template, $A_N$, may be adjusted by adding each image (a matrix represented by the pixel data), I, processed by the "brain application" to the average of N templates, by registering the image to the average, and then adjusting the average. The new aggregated template, $A_{N+1}$, may be represented by:

$$A_{N+1} = (N^*A_N + I)/(N+1) \qquad \text{(Eq. 4)}$$

Selecting an image processing application for an image based on image content, particularly when it is based on image pixel data may be a time consuming process. Depending on the size of the images and the number of class templates to which the images are to be compared, the time from image selection until its processing may vary. In certain embodiments, it may not be necessary for a human user to select the image or images for processing, rather an offline server that monitors the database for incoming scans, or new image files. In these embodiments an automated system preprocesses images prior to presenting them to users for viewing. In certain embodiments, an intelligent storage system may automatically generate structured reports based upon pixel data, header data, or any other image content or combination of image content. For example, an intelligent storage system may automatically classify each new image that is scanned, loaded or otherwise entered into the system, by comparing the image to a series of class templates.

In certain embodiments, images may be automatically coordinated with image processing applications so that the correct application automatically processes the image without human intervention. For example, an intelligent storage system may recognize an incoming scan and begin a classification of the image based on the image content, and assign the image a processing application. The processing could either be performed automatically offline, or the offline image monitoring embodiments may provide for quicker image processing when the image is selected for processing and viewing by a user, as the classification and application selection process, will have already been completed.

Figure 4:
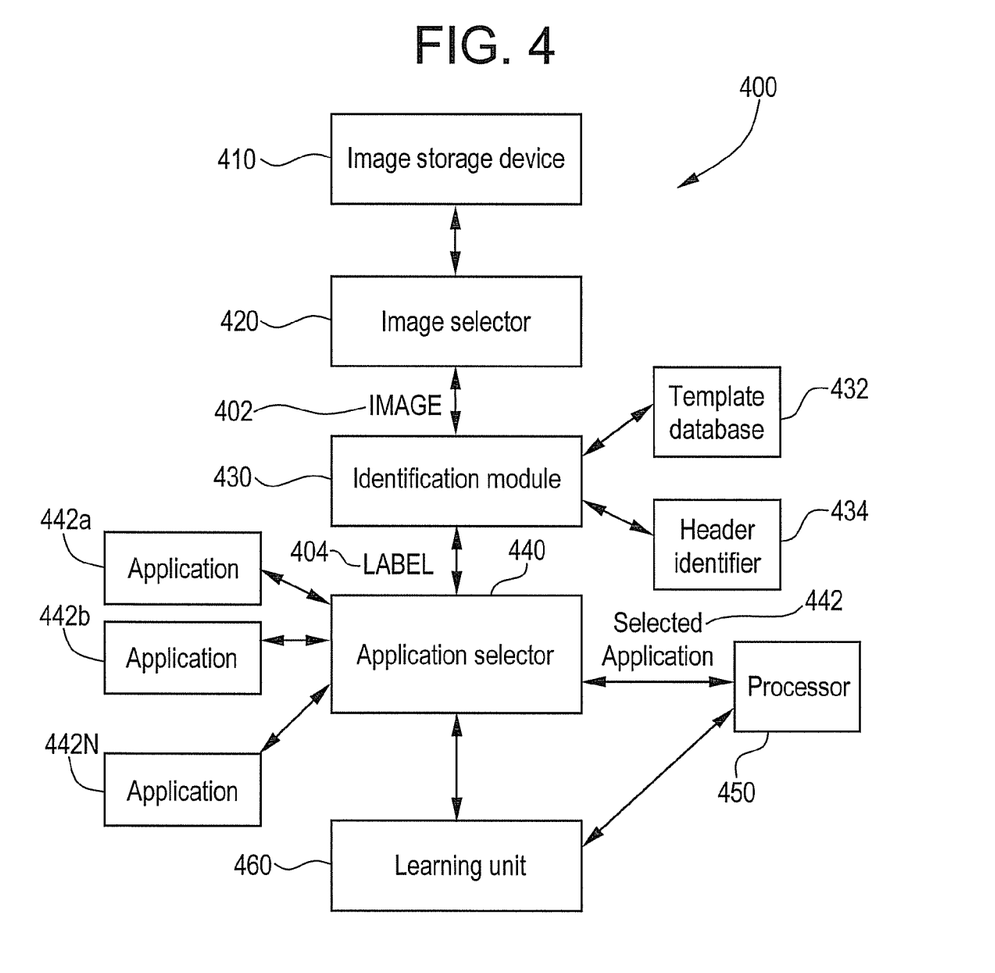
FIG. 4 illustrates an embodiment of a system selecting an application to process a selected image.

FIG. 4 illustrates an example embodiment of a system 400 for selecting an application to process a selected image. An image selector 420 selects an image 402 from an image storage device 410. The image selector 420 may be a user interface allowing a user to browse or operate image storage device 410. Alternatively, the image selector 420 may be a server automatically selecting images added to the image storage device 410. The image storage device 410 may be a database and/or databases of image files, an image uploading device and/or devices such as a scanner or digital camera, a server and/or servers connected to the image selector 420 on line, off line or both, for example. Additionally, the image storage device may be a system including a database and/or databases, an image uploading device and/or devices, and/or a server and/or servers.

Upon selection of an image 402, an identification module 430 produces an identification and/or identifications for the selected image based upon the content of the image 402. The identification module 430 may reference the header, tags, labels, metadata or other content of the image with a header identifier 434 to produce an identification, or label 404 for the image 402. For examplean image may be scanned with the following header information "Saggital, SPGR, Adult Male." The identification module 430 may then compare this information with information in the header identifier 434, which may be a Table (e.g., Table 1), a database or other reference source. Based upon the information in the header and in the header identifier 434, the identification module 430 may then provide the image 402 with one or more labels 404. The labels 404 may be an application name, or a list of application names that are likely to process the image 402 successfully, for example.

In certain embodiments, the identification module 430 may use pixel data to provide an image label 404. In certain embodiments the identification module 430 may compare the pixel data of the image 402 with the pixel data of class templates located within a template database 432, as described above and illustrated in FIGS. 1 and 2, for example. Based upon the template to which the identification module 430 determines the image 402 to be most similar to, the identification module may provide a label 404, for example. In certain embodiments, the label 404 may identify an application 442, for example. In certain embodiments, the label 404 may identify a class of images, or classes of images to which the module 430 has determined that the image 402 belongs. In certain embodiments, the identification module 430 uses Bayesian inference to determine the label 404.

In certain embodiments, an application selector 440 selects one or more applications from a plurality of available applications, individually referenced as 442a, 442b, . . . 442N. In certain embodiments, the application selector matches the image 402 with an application 442 using a Table, database or other reference source based upon the label 404 of the image 402. In certain embodiments, a learning unit 460 provides a reference to the application selector 440 based on a record of results from previous image processing attempts. The identification module 430 may consider such information in the learning unit 460 to assist in making the selection. The information may be input into the learning unit 460 automatically by the application selector 440, or by a user.

In certain embodiments, once the application selector 440 selects an application 442 to process the image 402, a processor 450 operates the application 442, and processes the image 402. If the image successfully processes, the application selector 440, a user, or the processor 450 may communicate this information with the learning unit 460, and the learning unit 460 may update the record accordingly. Alternatively, if the image does not successfully process, the selector 440, the processor 450 or a user may also communicate this information with the learning unit 460, and this information may be updated to the record. Accordingly, in certain embodiments, the learning unit 460 provides more a more intelligent reference for application selection based on an image label or other image content the more the system 400 is used.

Figure 5:
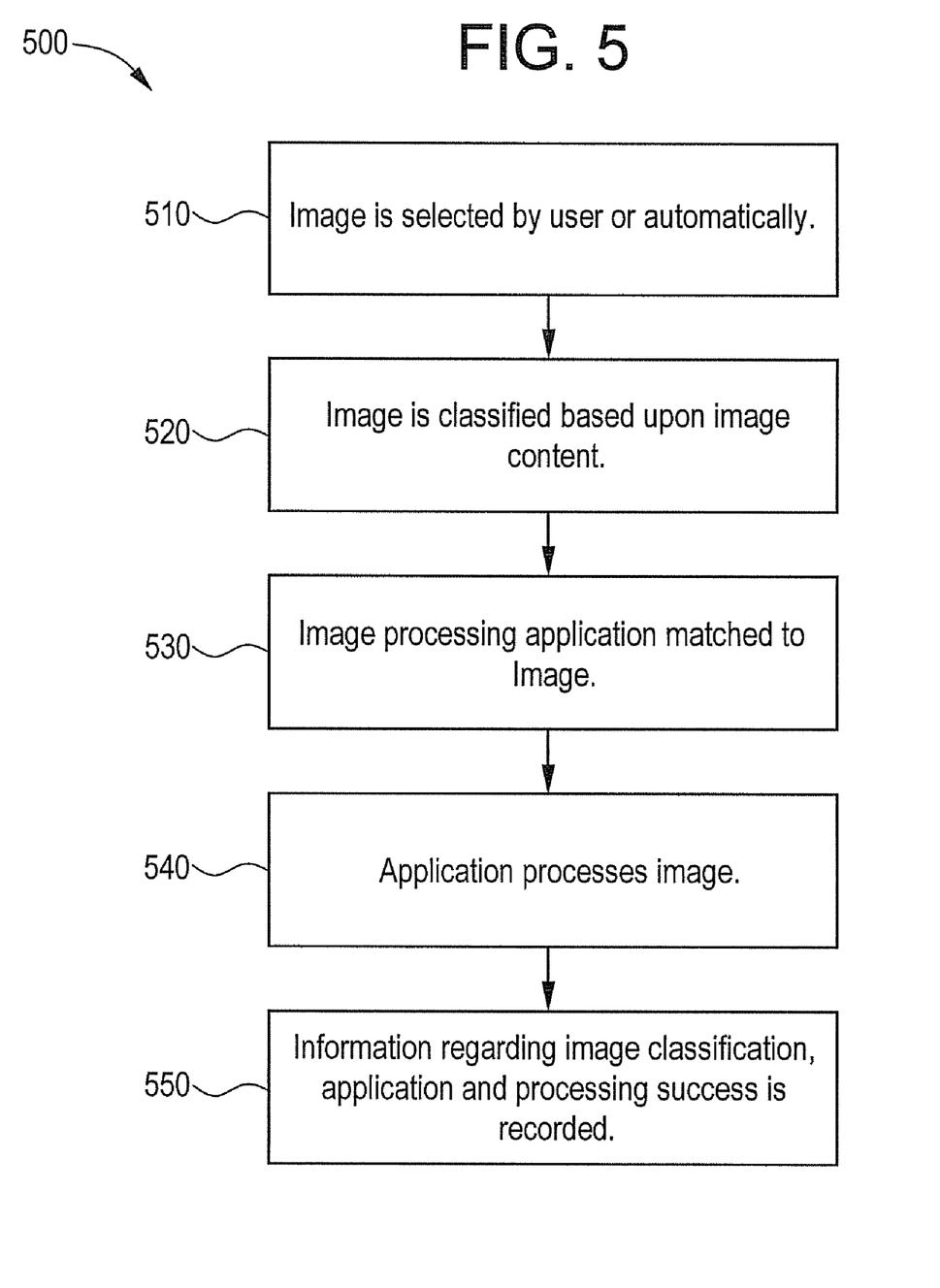
FIG. 5 illustrates a flow diagram of a method for selecting an application to process an electronic image.

FIG. 5 depicts a method 500 for using image content to select an application to process a selected image. In step 510 a user, or an offline server, selects an image or images for processing. A user may select an image by using a mouse via an interface to click on an icon representing the image, for example. Alternatively, an offline server may select an image automatically when the image is scanned or loaded into a database connected to the server.

In step 520, the image is classified based upon content of the image. In certain embodiments, the system of FIG. 1, 2, or 4 compare the image to a series of class templates and determine the template most similar to the selected image. In certain embodiments a system, for example system 400 illustrated by FIG. 4, analyzes header data, file metadata such as tags, or the file name to classify the selected image. In certain embodiments an identification system, for example the identification module of FIG. 4 applies a label to the image based upon the content of the image.

In step 530, an image processing application is matched, or assigned to process the selected image. In certain embodiments, multiple image processing applications may be capable of processing the selected image; accordingly, multiple applications may be assigned to the selected image. In certain embodiments, a system matches an image with an application based upon the label provided to the image. In certain embodiments, the image is matched with an application based on the class of image to be processed. For example, the application selector 440 illustrated in FIG. 4 may match an image classified as a brain scan with an application suited for processing images classified as brain scans.

In step 540 the matched image processing application processes the selected image. In certain embodiments, such as those described above where multiple applications are assigned to the selected image, a user may be provided, via a user interface, an option to select an application among the plurality of available applications. In other embodiments, a system may automatically choose the application to process the image based upon a determination of which of the plurality of applications is most frequently used to process images similar to the selected image, for example.

In step 550, information about the image content and the image processing application is recorded. For example, if the image is successfully processed by the application, the system recognizes the success and updates the record to positively reinforce the selection process used. Alternatively, for example, if the image is not processed successfully by the application, the system updates a record such that the processing failure is considered when the system is presented with a similar image for processing in the future.

Certain embodiments provide advantages over the current state of the art. In certain embodiments, a user selects an image for processing; thus the user is relieved from the additional duties of selecting the application for processing. In certain embodiments, more than one application is able to process the selected image. The system may present the user with an abbreviated list of the applications determined to be capable of processing the image. Such an abbreviated list may be significantly reduced from the entire list of applications, thereby saving the user significant time that may otherwise be spent browsing, surfing, or researching applicable applications. Alternatively, certain embodiments may present the user with a subset of relevant features of an application. Example application features may include, but need not be limited to, drawing Regions Of Interest (ROIs), smoothing filters, image enhancement filters, thresholds and other segmentation tools, registration, plotting, volume rendering, and surface rendering.

Certain embodiments provide for automatic selection of an image by a server. Intelligent image pre-processing may automate the entire system, requiring no user intervention to identify the image type. Such an embodiment may be applied toward generation of structured reports, or intelligent storage systems, and may be done during periods where no user is operating with the system.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of any clinical system. Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. An image processing application selection system comprising:
   at least one computer processor for executing an application selection process on a computer, said at least one computer processor comprising:
   at least one an image selection processor selecting an image from an image storage device;
   at least one identification processor automatically, without user intervention, providing a label to said selected image based on the content of said image;
   at least one application selection processor automatically, without user intervention, providing at least one application to process said selected image; and
   at least one learning processor maintaining a record of image labels and the applications presently and previously processing said images.

2. The image processing application selection system of claim 1, wherein said learning processor updates said record with said image label and said selected application for said image, and said application selection processor providing said application based on said label provided by said identification processor and said record in said learning unit.

3. The image processing application selection system of claim 1 wherein said identification processor provides said label to said image based on metadata of said image.

4. The image processing application selection system of claim 1 wherein said identification processor provides said label to said image based on the pixel data of said image.

5. The image processing application selection system of claim 4, wherein said identification processor accesses a template database, said template database comprising one or more template files, each of said template files corresponding to one or more of said image categories, and wherein at least one of said template files is an aggregate template file, said aggregate template file being formed from a plurality of individual templates.

6. The image processing application selection system of claim 5 wherein said image identification processor compares said selected image file with two or more said template files and provides an image label for said selected image, said label identifying at least one of said image categories based on based on the results of said comparison with said two or more template files.

7. The image processing application selection system of claim 1 wherein said identification processor provides said label to said image based on both the pixel data of said image and the header data of said image.

8. The application selection system of claim 1 wherein said image selection processor operates a user interface, said user interface allowing a user to select an image file from said image storage device.

9. The application selection system of claim 1 wherein said image selection processor automatically selects an image from said image storage device.

10. The application selection system of claim 1 wherein said application selection processor provides a user interface, said user interface providing an array of applications for user selection, wherein the applications presented in said array are based on said label of said selected image.

11. The application selection system of claim 10 wherein said array of applications are arranged in order based on likelihood of user selection, said likelihood of user selection calculated by said learning unit.

12. The application selection system of claim 10 wherein said application selection processor uses a Bayesian inference to select an application for processing said image.

13. A method of selecting an application for image processing comprising:
   selecting an electronic image;
   classifying said image based upon the content of said selected image;
   matching an image processing application to process said electronic image, said matching based on the said classification of said image;
   processing said image with said matched application;
   maintaining a record of images presently and previously processed and the applications processing said images, updating said record when said image is processed;
   wherein said classifying step and said matching step are performed automatically without user intervention.

14. The method of claim 13 wherein said classifying step further comprises providing a label to said electronic image based on said content of said image.

15. The method of claim 13 wherein said matching step further comprises consulting said record.

16. The method of claim 13 wherein said classification step further comprises comparing pixel data of said electronic image with a plurality of image templates.

17. The method of claim 13 wherein said classification step classifies said image based on image header data.

18. The method of claim 13 wherein said classification step classifies said image based on image pixel data and image header data.

19. The method of claim 13 wherein said matching step uses a Bayesian inference to match said image with said image processing application.

20. An image processing application selection system comprising:
- an image retrieval device selecting an electronic image from an image storage device;
- a region partitioner, partitioning said image into one or more image regions having at least one pixel;
- a relationship processor identifying relative relationships between said partitioned regions;
- an association operator automatically associating attributes of each said region in said image with at least one other region in said image;
- a template database comprising a plurality of template images, said template images representing at least one image class;
- a detector matching said image with at least one said template image and classifying said image with said at least one image class of said at least one template image;
- an application selector automatically providing at least one selected application to process said selected image, said selected application provided based upon said at least one image class classifying said image; and
- a learning unit maintaining a record of image classes and the applications presently and previously operating said images.

* * * * *